United States Patent [19]

Jackisch

[11] 4,276,189
[45] Jun. 30, 1981

[54] STABILIZATION OF DIBROMOSTYRENE

[75] Inventor: Philip F. Jackisch, Royal Oak, Mich.

[73] Assignee: Ethyl Corporation, Richmond, Va.

[21] Appl. No.: 130,187

[22] Filed: Mar. 13, 1980

[51] Int. Cl.³ ................... C09K 15/08; C09K 15/32
[52] U.S. Cl. ........................... 252/404; 252/400 R; 252/609; 570/103; 570/105
[58] Field of Search ............ 252/1, 182, 609, 400 R, 252/404; 260/651 R; 526/296

[56] References Cited

U.S. PATENT DOCUMENTS 2,493,427  1/1950  Thomas ........................ 260/651 R

FOREIGN PATENT DOCUMENTS 620022  5/1961  Canada ........................ 570/118
1230979  5/1971  United Kingdom .

*Primary Examiner*—Leland A. Sebastian
*Attorney, Agent, or Firm*—Donald L. Johnson; Joseph D. Odenweller; John F. Hunt

[57] ABSTRACT

Mixing dibromostyrene with a metal oxide such as zinc oxide lengthens the induction period before polymerization of dibromostyrene. Preferably, the dibromostyrene has low levels of 2-bromoethyldibromobenzene and tribromostyrene impurities.

14 Claims, 1 Drawing Figure

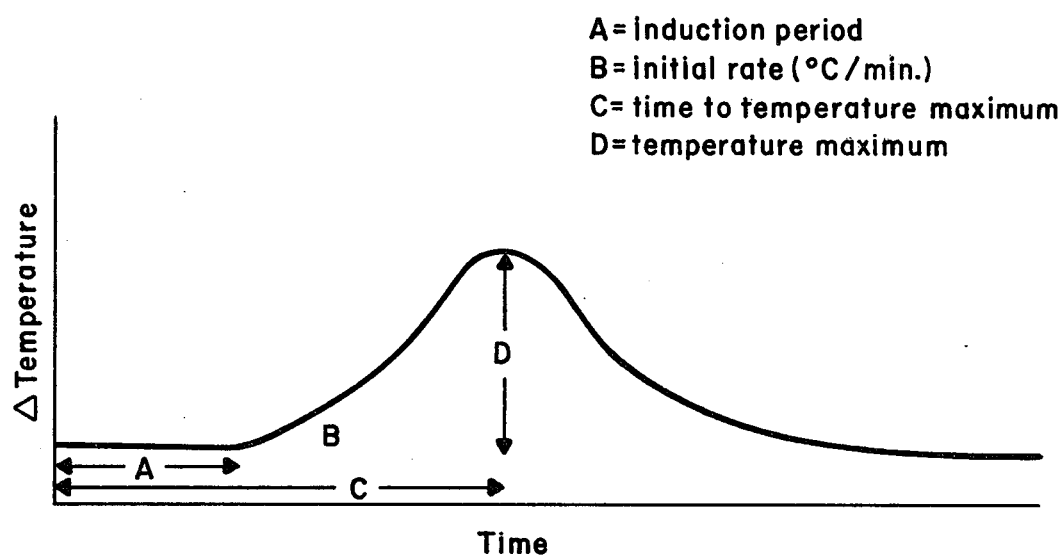
Representative Differential Thermal
Analysis Curve of Polymerization were filled with 5 drops of Dow Corning No. 200 silicone oil to help in heat transfer. The thermopiles were inserted into the thermowells of two cells, one containing an inert fluid (originally m-dibromobenzene but more recently Dow Corning No. 200 Silicone Oil), and the other approximately 15 g (9 ml) of dibromostyrene. The sample and reference cells were placed in a wooden holder in a Blue M, Stabil-Therm Poweromatic 70 oven. The oven temperature was measured with a Doric Trendicator 400A type K/°C. digital pyrometer connected to a thermocouple with its end in the wooden cell holder. The temperature differential between the reference cell and the monomer-containing cell was recorded on a Houston Instruments OmniScribe recorder at either 1 millivolt or 10 millivolts full scale (equal to 4.8 or 48 degrees C.).

Using this method, 4-tert-butylcatechol, 400 ppm and 400 ppm of the same substance admixed with 1200 ppm MgO, was tested in dibromostyrene.

The results were as follows:

| Stabilizer | Conc. (ppm) | Storage Temp. | A Induction Period | B Initial Rate | C Time to Max. | D Maximum Temp. 0° C. |
|---|---|---|---|---|---|---|
| None | — | 75° C. | 0 | 11°/hr. | 3.9 hr. | 4.8 |
| TBC | 1000 | 85° C. | 0 | 1.6°/hr. | 2.2 hr. | 8.8 |
| MgO | 1200 | 75° C. | 0 | .44°/hr. | 6.0 hr. | 6.3 |
| MgO plus TBC | 400 | 75° C. | 32 | .04 | 41 | 74 |
| TBC* | 400 | 75° C. | 74 | .20 | 79 | 2.5 |

*Sample pretreated with 1200 ppm MgO, then filtered

The use of MgO (1200 ppm) admixed with other hydroxy compounds was investigated and the results are summarized in the following table.

Structural Effects in the Inhibition and Retardation of Dibromostyrene Polymerization

| Inhibitor Structure | 400 ppm at 75° C. | Induction Period | Initial Polymerization rate | Time of Max. Rate | Temperature Maximum |
|---|---|---|---|---|---|
| None | | 0 hr | 11°/hr | 3.9 hr | 4.8° |
| MgO | | 0 | 0.44 | 6.0 | 6.3 |
| MgO + | phenol (OH) | 4.6 | 2.6 | 8.4 | 12.1 |
| MgO + | 2,4,6-trisubstituted phenol | 1.2 | 0.83 | 10.7 | 5.4 |
| MgO + | [HO-Ar-CH₂CH₂C(O)O-CH₂-]₄C | 0 | 2.9 | 5.8 | 11.8 |
| MgO + | hindered phenol with CH₂N(CH₃)₂ | 7.0 | 0.11 | 26.8 | 1.1 |
| MgO + | hydroquinone | 10.4 | 0.11 | 24.1 | 11.0 |
| MgO + | substituted resorcinol/hydroquinone | 16.0 | 0.56 | 24.1 | 3.6 |
| MgO + | substituted hydroquinone | 2.5 | 0.10 | 18.6 | 3.6 |
| MgO + | substituted hydroquinone | 3.3 | 1.6 | 15.0 | 3.6 |

STABILIZATION OF DIBROMOSTYRENE

BACKGROUND OF THE INVENTION

Dibromostyrene, which has been suggested as a flame retardant monomer, has a considerable tendency to undergo polymerization during storage. This polymerization tendency is greater than with styrene itself. It has been suggested in British Pat. No. 1,230,979, that dibromostyrene be stabilized with picric acid or a mixture of picric acid and (i) a quinone such as hydroquinone or benzoquinone or (ii) a phenol such as 4-tert-butylcatechol.

SUMMARY OF THE INVENTION

This invention comprises the discovery that undesired polymerization of dibromostyrene during storage is reduced if the dibromostyrene is intimately mixed with a metal oxide such as magnesium oxide. Thus, this invention comprises the process for stabilizing dibromostyrene from undesirable polymerization, said process comprising intimately mixing said dibromostyrene with a polymerization inhibiting amount of a mildly basic metal oxide.

The magnesium oxide does not by itself give a prolongation of an induction period, hence, the MgO or similar oxide is preferably used in conjunction with another stabilizer. The dibromostyrene can be treated with the metal oxide, then the MgO removed by filtration and the dibromostyrene then treated with a stabilizer such as 4-tert-butyl catechol. This gives a longer induction period than when the tert-butyl catechol is used without the metal oxide treatment. Alternatively, the dibromostyrene can be treated with a mixture of MgO or similar oxide and a stabilizer such as tert-butyl catechol. This also gives a longer polymerization inhibition period than when the 4-tert-butyl catechol is used without the metal oxide.

This invention comprises dibromostyrene which has improved properties conferred by this invention. It also comprises as compositions of matter the mixtures of weakly basic metal oxides as disclosed herein, together with one or more phenolic or benzoquinoid stabilizers as disclosed herein. As another embodiment, this invention also embodies dibromostyrene improved by this invention and also containing less than a specified amount of 2-bromoethyldibromobenzene and/or tribromostyrene impurity.

DESCRIPTION OF THE DRAWING

The drawing shows a representation of a differential thermal analysis (DTA) curve obtained when the polymerization of dibromostyrene with an inhibitor is followed by DTA using the apparatus and procedure described herein. As shown, the value for A indicates the length of the induction period before the polymerization ensues, while the value for C indicates the time for the polymerization to reach its maximum. The slope of the curve at B after the terminus of A is an indication of polymerization rate, while the height of D gives the temperature maximum reached.

Without a polymerization inhibitor, the period indicated by A is non-existent or very short. With a polymerization retardant, the slope of the line at B is less steep and diminishes the height D.

DESCRIPTION OF PREFERRED EMBODIMENTS

This invention works well when applied to dibromostyrene made by dehydrohalogenation such as dehydrobromination of a 2-bromoethyldibromobenzene. A preferred method for the dehydrobromination is that described in my copending application entitled "Preparation of Dibromostyrene" and filed concurrently with this application. It is not critical that this invention be applied to dibromostyrene made in the manner disclosed in that application.

The results with magnesium oxide disclosed below suggest that additional mildly basic metal oxides such as CaO and ZnO can be used. The amount of such metal oxide to be used is a "stabilizing quantity", a quantity which will prolong the induction period beyond that which occurs when the dibromostyrene is treated with an inhibitor such as those disclosed in British Pat. No. 1,230,979, supra. A skilled practitioner can readily determine what a stabilizing quantity is by using the technique described in the example below and comparing the inhibition period obtained with 400 ppm of tertiary butyl catechol (TBC) with the inhibition period obtained when the same amount of TBC is admixed with the amount of oxide under investigation. If the TBC-oxide mixture confers a longer induction period on the dibromostyrene, then the amount of oxide is a stabilizing amount.

Generally from about 20 to about 2000 ppm of metal oxide is used with about 100 to about 400 being preferred.

The MgO or other oxide can be used with 4-tert-butyl catechol as mentioned above or with other stabilizers such as those mentioned in British Pat. No. 1,230,979, which form stable picrates, viz Examples of these are catechol itself, resorcinol, phloroglucinol and alkyl substituted, particularly t-alkyl substituted, derivatives thereof. Naphthoquinones and anthraquinones are not thought, generally, to form stable picrates but most benzoquinones are, for example dialkyl benzoquinones or chloroanil. Other substituted phenols, for example dinitrophenol, are thought to form stable picrates. Certain quinones or phenols themselves show an inhibiting effect on the polymerisation of styrene based monomers particularly on styrene itself and it is particularly desirable to use these. Examples of such quinones and phenols are t-butyl catechol, benzoquinone and hydroquinone.

The degree of protection afforded by this invention against unwanted polymerization of dibromostyrene is dependent on the temperature to which the dibromostyrene is exposed. Preferably the temperature is kept at normal storage temperatures and preferably below about 55° C. or more preferably, below about 35°–38° C. A temperature of 75° C. or thereabouts can be used in testing to shorten the test time period.

EXAMPLE 1

A differential thermal analysis apparatus was constructed to measure the heat of polymerization of stored samples. Two thermopiles were constructed (originally with 6 thermocouples, later with 5) with iron-Constantin junctions. Sample containers consisted of 18 ml widemouthed bottles with caps drilled with a hole through which was fitted a piece of glass tubing sealed at the bottom end to form a thermowell. The glass tubes were 8 mm in outside diameter and 90 mm long and -continued Structural Effects in the Inhibition and Retardation of Dibromostyrene Polymerization

| Inhibitor Structure | 400 ppm at 75° C. | Induction Period | Initial Polymerization rate | Time of Max. Rate | Temperature Maximum |
|---|---|---|---|---|---|
| MgO + | 4-methoxyphenol (OH, OCH₃) | 1.3 | 0.44 | 8.8 | >4 |
| MgO + | catechol (OH, OH) | 5.8 hr | 0.03°/hr | 20.2 hr | 3.0° |
| MgO + | 4-t-butylcatechol (OH, OH, t-Bu) | 32.0 | 0.04 | 41.0 | >4 |
| MgO + | di-t-butyl catechol (OH, OH) | 0 | 0.25 | 6.7 | 3.4 |
| MgO + | octyl gallate (HO, OH, OH, COOC₈H₁₇) | 17.4 | 0.36 | 24.2 | 2.5 |
| MgO + | p-benzoquinone (O, O) | 0 | 0.16 | 10.0 | >4 |
| MgO + | 2,5-dihydroxy-p-benzoquinone (HO, OH, O, O) | 37.0 | 0.08 | 44.0 | 1.0 |

The above results suggest use of from about 20 to about 2000 ppm of MgO, preferably 100–1200 ppm, based on the weight of the dibromostyrene and also the use of 20 to 2000 ppm, preferably 100–600 ppm, of a phenol or diphenol inhibitor. It appears from the above results that dibromostyrene is subject to polymerization via both cationic and free radical mechanisms, and both must be inhibited for effective control of unwanted polymerization of the dibromostyrene.

As shown, the longest induction period (37 hours) at 75° C. has been obtained with 2,5-dihydroxy-p-benzoquinone and the greatest retarding effect has been obtained with catechol (0.03° hr initial temperature rise). 4-t-Butylcatechol shows an induction period almost as long (32 hours) and a retarding effect (0.04° hr) almost as great and retards the final polymerization less than the other two materials (desirable from the user' standpoint). It also gives much less color in the polymer than the 2,5-dihydroxy-p-benzoquinone.

During the course of this work, evidence was also adduced demonstrating that traces of 2-bromoethyldibromobenzene in dibromostyrene makes dibromostyrene more readily stabilized than dibromostyrene that has been carefully purified of this impurity. Although not bound by any theory, it is believed 2-bromoethyldibromobenzene acts as a chain transfer agent to retard the free radical polymerization process and is therefore less desirable from the standpoint of the user who will polymerize dibromostyrene stabilized in accordance with this invention. Accordingly, it is recommended that the dibromostyrene (which is normally predominantly 2,4-ar-dibromostyrene) contain less than about 0.1 wt. percent of 2-bromoethyldibromobenzene.

It was also adduced during the course of this work that tribromostyrene impurity made the dibromostyrene much more difficult to stabilize; hence, it is also preferred that the tribromostyrene content of the dibromostyrene, be as low as readily possible, say, less than about 2 wt. percent.

The effect of tribromostyrene is shown in the following table where a batch of dibromostyrene containing 8.7 percent tribromostyrene impurity is compared with the dibromostyrene used in the example and tests given above. Tribromostyrene was also shown to be less stable than dibromostyrene.

| Batch 1 Dibromostyrene | 8.1 percent monobromostyrene 1.4 percent tribromostyrene |
|---|---|
| Batch 2 Dibromostyrene | 1.1 percent monobromostyrene 8.7 percent tribromostyrene |

| | Induction Period | | Initial Rate | |
|---|---|---|---|---|
| Inhibitor | Batch 1 | Batch 2 | Batch 1 | Batch 2 |
| None | 0 hr. | 0 hr. | 11.0° hr. | 3.8° hr. |
| MgO | 0 | | 0.44 | |
| TBC MgO | 32.0 | 2.9 | 0.04 | 4.4 |
| Phenol 1 | 0 | 0 | 1.4 | 1.6 |
| Phenol 2 | 0 | 0 | 0.22 | 6.8 |
| Phenol 3 | 0 | 0 | 1.1 | 2.5 |

| | | | -continued | |
|---|---|---|---|---|
| Phenol 4 | 0 | 0 | 0.08 | 1.0 |

In the above table:
Phenol 1 is α,α-thiobis(2,6,-di-tert-butyl-p-cresol),
Phenol 2 is 2,5-dicyclopentyl-4-methylphenol,
Phenol 3 is α,α',α"-(trimethyl-s-phenenyl)tris(2,6-di-tert-butyl-p-cresol), and
Phenol 4 is 2,6-di-tert-butyl-α-dimethylamino-p-cresol.

I claim:

1. The process for stabilizing dibromostyrene from undesirable polymerization, said process comprising intimately mixing said dibromostyrene with a polymerization inhibiting amount of a mildly basic metal oxide.

2. A process of claim 1 wherein said oxide is selected from the class consisting of magnesium oxide, calcium oxide, and zinc oxide.

3. A process of claim 2 wherein said oxide is magnesium oxide.

4. A process of claim 2 wherein the amount of magnesium oxide used is from about 20 to about 2000 ppm based on the weight of said dibromostyrene.

5. A process of claim 4 wherein said oxide is removed from said dibromostyrene prior to stabilization of said styrene with another stabilizer.

6. A process of claim 5 wherein said magnesium oxide and dibromostyrene is admixed with a non-polymerization stabilizing amount of 4-tert-butyl catechol.

7. A process of claim 6 wherein said catechol is used in an amount of from about 20 to about 2000 ppm, based on the weight of said dibromostyrene.

8. A process of claim 5 wherein said other stabilizer is 2,5-dihydroxy-p-benzoquinone present in an amount of from about 20 to about 2000 ppm based on the weight of dibromostyrene.

9. A process for stabilizing dibromostyrene against undesirable polymerization, said process comprising adding to a dibromostyrene preparation having less than about 0.1 weight percent 2-bromoethyldibromobenzene impurity, and less than about 2 weight percent tribromostyrene impurity, from about 20 to about 2000 ppm MgO and from 20 to about 2000 ppm of a stabilizer selected from the class consisting of tert-butyl catechol and 2,5-dihydroxy-p-benzoquinone.

10. A process of claim 9 wherein said stabilizer is 4-tert-butyl catechol.

11. A dibromostyrene stabilized by admixture therewith of a polymerization inhibiting amount of an oxide selected from magnesium oxide, calcium oxide, and zinc oxide.

12. A dibromostyrene stabilizing composition comprising magnesium oxide and 4-tert-butyl catechol or 2,5-dihydroxy-p-benzoquinone.

13. A composition of claim 12 wherein said magnesium oxide is admixed with 4-tert-butyl catechol.

14. A composition of claim 13 wherein the weight ratio of MgO to said catechol is from about 0.1 to about 10 parts by weight MgO to about 1 part by weight of said catechol.

* * * * *

UNITED STATES PATENT AND TRADEMARK OFFICE
CERTIFICATE OF CORRECTION

PATENT NO. : 4,276,189
DATED : June 13, 1981
INVENTOR(S) : Philip F. Jackisch

It is certified that error appears in the above-identified patent and that said Letters Patent are hereby corrected as shown below:

Columns 3-4 - the first chemical structure in the table reading:

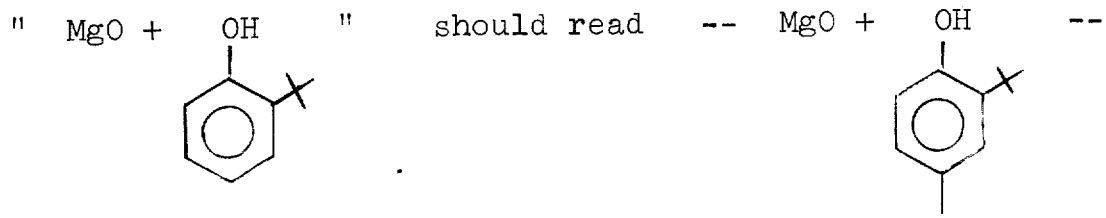

Column 5, line 55 - "user'" should be -- users' --

Signed and Sealed this

Twenty-second Day of September 1981

[SEAL]

Attest:

GERALD J. MOSSINGHOFF

*Attesting Officer*  Commissioner of Patents and Trademarks